April 10, 1934.    C. R. SIBLEY ET AL    1,954,229
FREEZING AND DISPENSING DEVICE
Filed March 3, 1932    3 Sheets-Sheet 2

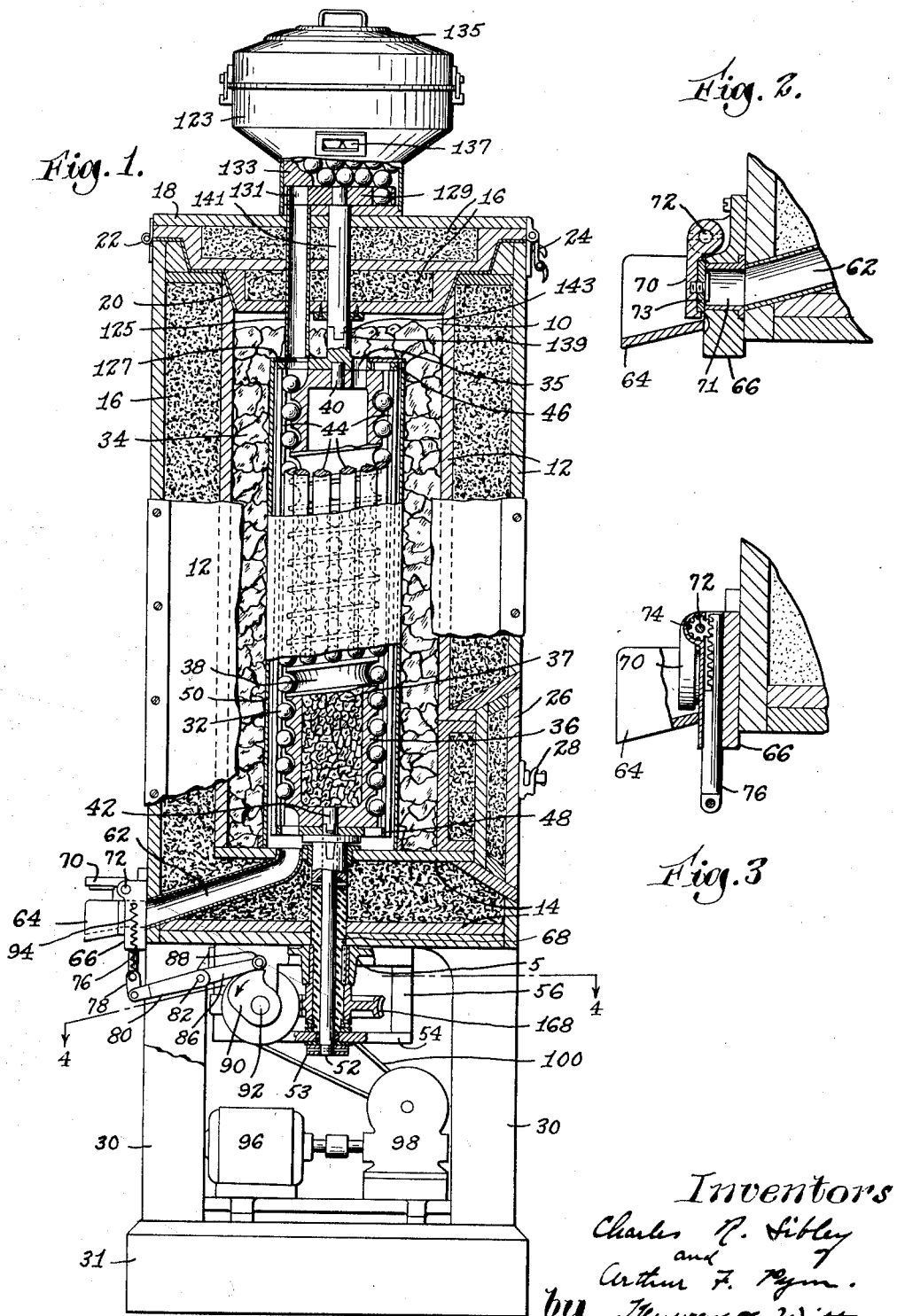

Inventors
Charles R. Sibley &
Austin F. Byrn
by Henway & Witter
Attorneys

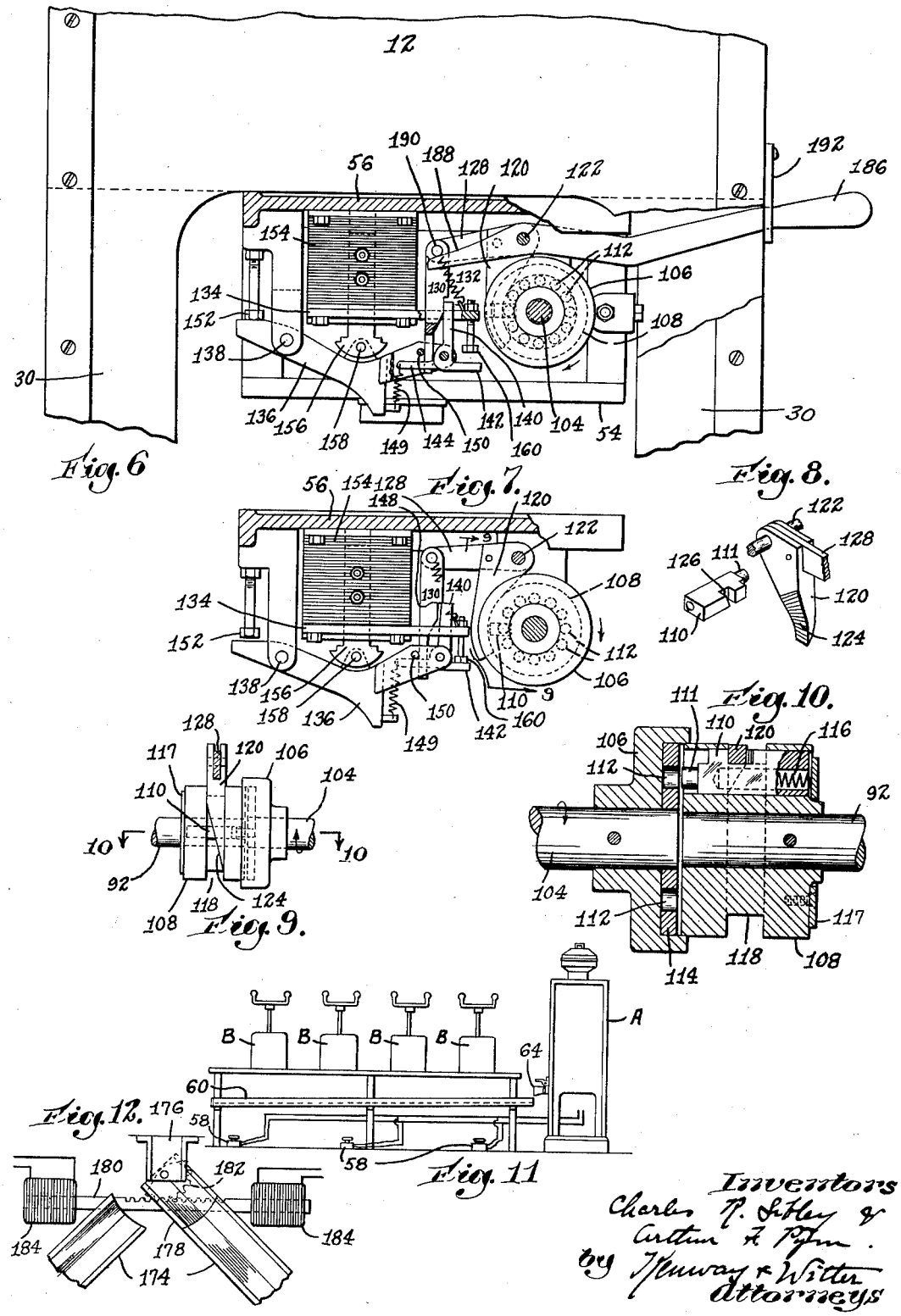

Patented Apr. 10, 1934

1,954,229

UNITED STATES PATENT OFFICE 1,954,229

FREEZING AND DISPENSING DEVICE

Charles R. Sibley, Marblehead, and Arthur F. Pym, Beach Bluff, Mass., assignors to Sibley-Pym Corporation, Lynn, Mass., a corporation of Massachusetts Application March 3, 1932, Serial No. 596,506

20 Claims. (Cl. 62—1)

This invention relates to devices for use in the manufacture of golf balls for freezing and dispensing core centers preparatory to winding them, or for freezing cores or balls for any purpose. In one aspect the invention consists in the further development of freezing and dispensing devices of the type disclosed in our copending application Serial No. 583,838, filed December 30, 1931. In another aspect it comprises broadly freezing and dispensing mechanism capable of delivering frozen balls as required at a selected station, for example, a winding machine, which may be located at a distance from the source of supply.

It has been found advantageous to employ a freezing apparatus having a capacity or output considerably greater than the requirements of an individual winding machine. The present invention, therefore, is concerned with the problem of dispensing and delivering frozen cores rapidly, accurately and more or less automatically from a central source of supply to a winding machine or to any one of a number of winding machines. It is desirable that each frozen core shall reach the winding machine with the least possible delay after leaving the freezing apparatus and that the manual handling of the frozen cores shall be reduced to a minimum. With these considerations in view, the device of our invention comprises a freezing chamber through which a relatively large quantity of cores may be passed and so frozen, in combination with automatic mechanism operating under remote control for releasing and discharging one frozen core after another as and when required.

The winding of golf ball cores is a semi-automatic operation and one operator can, therefore, attend to several machines, the operator being required only to start the thread upon the core, place the core in the machine, and remove the finished product. The dispensing and delivery of the frozen cores conveniently to the operator at the several machines as needed is of great importance since it serves not only to keep the machines busy but also to deliver the cores from the refrigerating chamber so quickly as to allow no substantial defrosting or softening thereof. To this end, an important feature of the invention consists, in combination with freezing apparatus having delivery mechanism extending to a distance therefrom, of one or more controllers located at convenient points upon or along the delivery mechanism as, for example, at stations occupied by separate winding machines.

It may be desirable to supply two or more operators with frozen cores from a single refrigerating device. In such case, each operator preferably will be provided with means for controlling the core-dispensing and delivering operations, and the device may be so constructed that none of the controlling means or members can interfere with a dispensing operation during the dispensing cycle thereof. The device may also embody independent delivering means to the different operators and in such case delivery of the dispensed cores to the operator corresponding to the controlling means functioned will preferably be automatically controlled from the said controlling means.

Other features of the invention relate more specifically to the construction and operation of the core dispensing and delivering mechanisms and to the controlling means therefor. These and other features of the invention will be best understood and appreciated from the following description of a preferred embodiment thereof, selected for purposes of illustration and shown in the accompanying drawings, in which Fig. 1 is a view in side elevation, partially in section, of the core freezing device;

Figs. 2 and 3 are fragmentary sectional views of a portion of the core dispensing mechanism, these views being taken on lines 2—2 and 3—3 of Fig. 5;

Fig. 6 is a fragmentary view of the dispensing mechanism taken approximately on line 6—6 of Fig. 4;

Fig. 7 is a view similar to Fig. 6 but showing the parts in another position;

Fig. 8 illustrates certain details of the clutch mechanism;

Fig. 9 is a fragmentary view taken on line 9—9 of Fig. 7;

Fig. 10 is an enlarged sectional view through the clutch on line 10—10 of Fig. 9;

Fig. 11 shows the general arrangement of the dispensing and distributing device in elevation; and Fig. 12 is a fragmentary plan view of a modified detail.

Figure 4:
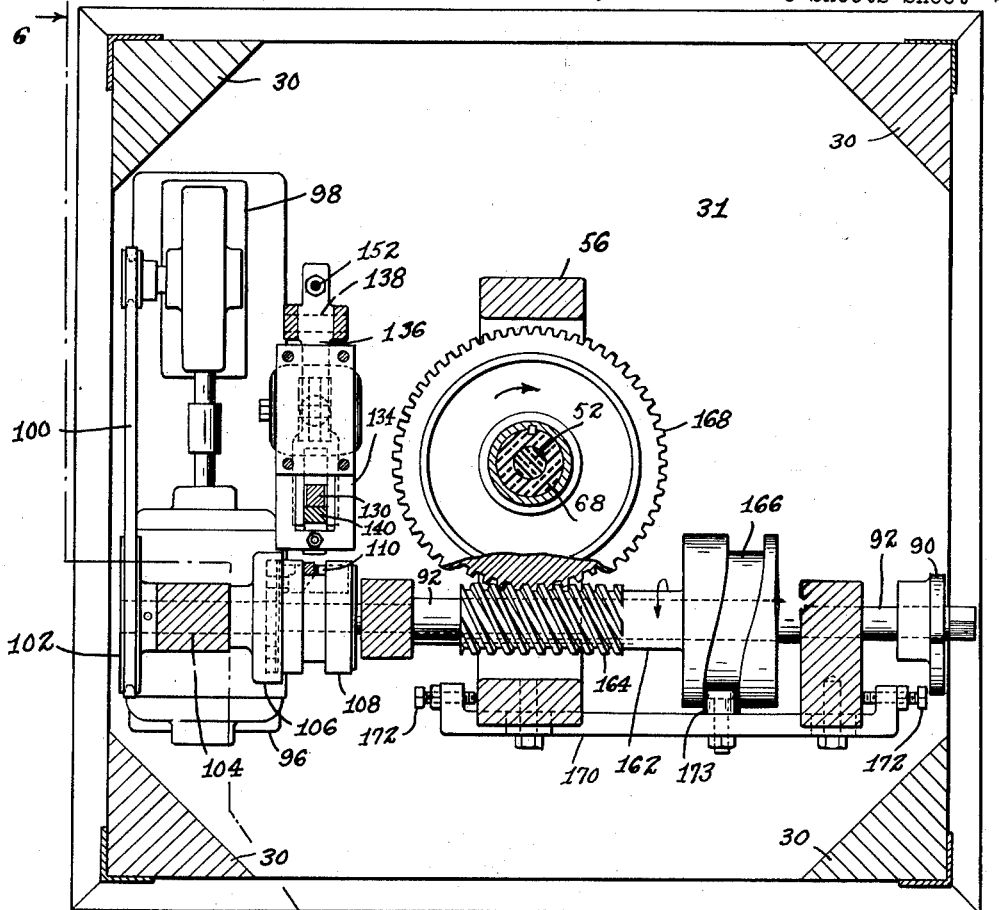
Fig. 4 is a sectional plan view taken on line 4—4 of Fig. 1.
Figure 5:
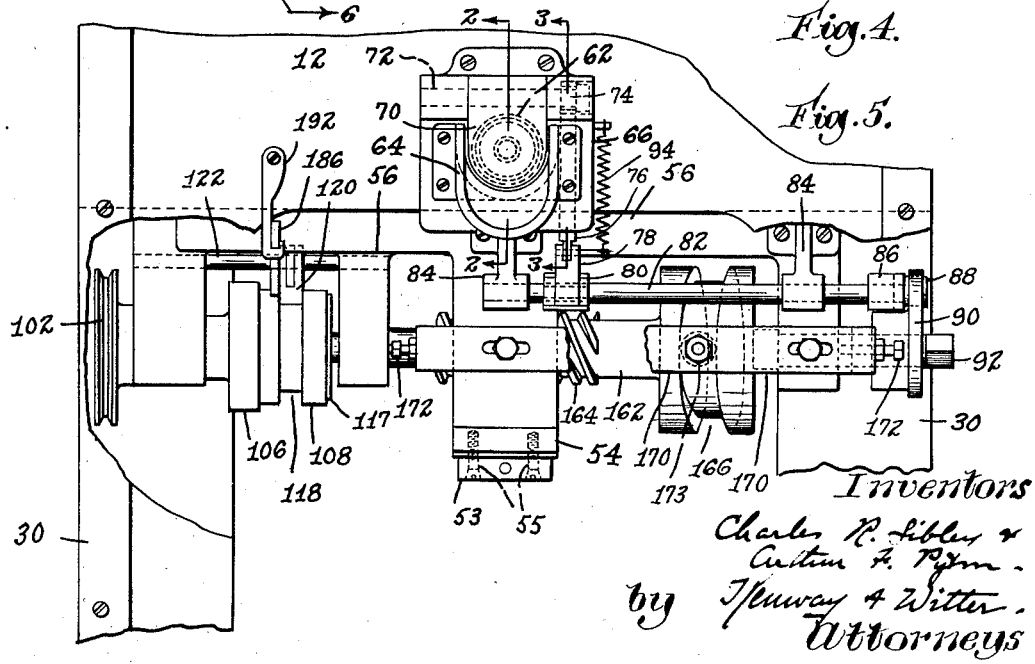
Fig. 5 is a fragmentary elevation of the core dispensing side of the device shown in Fig. 1.

The core or ball freezing portion of the device shown in Fig. 1 is substantially the same as that disclosed in our aforementioned copending application and may be briefly described as follows. A refrigerating chamber is formed by heat-insulating side and bottom walls 12 and 14 filled with ground cork or other heat-insulating material 16 and, when the refrigerant to be used is of a renewable nature, such as dry ice, the chamber will be provided with a removable cover 18 for permitting the chamber to be opened for repacking. The cover forms the top of the chamber and is preferably provided with a ground cork filling 16 and a liner 20 to insure complete insulation to the chamber. The cover may be hinged at 22 and held tightly closed by clamps 24. In the device herein shown there is no need of removing the cover during use except for the purpose of repacking the chamber with the refrigerant and this repacking operation will be necessary only at relatively long intervals. An opening to the bottom of the chamber for purposes of cleaning and defrosting the same is also provided through one of the side walls and this opening is normally closed by an insulated door 26 provided with a latch 28. The housing of the chamber may be supported by legs 30 on a base 31.

The container for receiving and retaining the core centers 32 is centrally disposed within the refrigerating chamber whereby it may be surrounded upon its exterior by a refrigerant 34. It is also provided with an opening 35 in one end whereby a refrigerant 37 may be packed internally therein, and the arrangement is such that a relatively long line of cores are supported in position between the two bodies of refrigerating medium and in such manner that the weight of the cores in the line is supported by means other than the cores themselves. We have found that a spiral path gently inclined downwardly is best adapted to serve the functions of properly supporting such a series of cores and exposing them most effectively to the refrigerant. We will now describe the means which we have illustrated in the drawings for forming this path for the core centers, or cores as they will be termed for convenience.

A vertically-disposed cylindrical member 36, preferably of aluminum or other heat-conductive material, is provided with a spiral groove 38 about its cylindrical surface and is centrally mounted in the refrigerating chamber by end studs 40 and 42. Surrounding and cooperating with the member 36 is a cylindrical cage comprising longitudinally-extending slats 44 secured at their top and bottom ends to disks 46 and 48. The cage is so spaced from the cylindrical member 36 as to cooperate therewith to support the cores in the groove 38, the slats 44 being so shaped as to project inwardly to engage and separate adjacent cores. The result is that these two co-operating members are adapted to hold a relatively long spiral line of cores in spaced relation, the cores also being maintained in vertical alignment by the slats. As thus supported, each core rests independently in the groove of the member 36 and is subject to no distorting pressure or weight from the line of cores above it. The member 36 is held stationary and the movement of the cores along the path 38 is governed by rotation of the cage, all as hereinafter described. A relatively thin and heat-conductive cylindrical shell 50 surrounds the cage in closely adjacent relation to protect the cores from direct contact with the exterior refrigerant 34 and at the same time facilitate the ready transfer of heat from the cores being frozen.

The bottom stud 42 is interlocked with the upper end of a vertical shaft 52 extending downwardly through the bottom wall 14 of the chamber and through a bottom plate 54 of a supporting frame 56. A cap plate 53 tightly secured to the lower end of the shaft 52 is secured to the plate 54 by screws 55. Means including a sleeve 68 surrounding the shaft 52 and connected to the cage 44 is supported on the frame 56 and is adapted to rotate the cage, as hereinafter described.

The general arrangement of the dispensing and delivering mechanism illustrated in the drawings may be briefly described as follows. Referring to Fig. 11, it will be seen that a single core freezing device A is associated with a plurality of core winding machines B, it being understood that these machines B are semi-automatic in operation and, therefore, several of such machines may be served by a single attendant. An inclined runway 60 extends from the core freezing device A along the front of the bench upon which the winding machines B are installed and is arranged to receive the cores as they are dispensed and deliver them in convenient position for the operator to pick up and place in a winding machine. The arrangement illustrated presents the advantages of quick and convenient delivery of the frozen cores from the freezing device A to the attendant as needed, whereby (1) the cores will be wound while in their solid frozen state, (2) the attendant will be enabled to keep the machines in useful operation, and (3) inconvenient and slow manual handling of the frozen cores will be eliminated. The dispensing of the cores from the freezing device A is controlled by the attendant by means of one or more conveniently arranged switches or controllers 58. We will now proceed to describe this specific mechanism herein illustrated.

The disks 46 and 48 forming the opposite ends of the cage 44 have core passages therethrough in alignment with the vertical lines of cores 32 within the cage. A core discharging channel is provided by a tubular member 62 extending downwardly and outwardly from the bottom end of the spiral groove 38 beneath the disk 48 to a discharging spout 64 mounted on a block 66 secured to a side wall 12. The outer end of the channel 62 is normally closed by a flap-like door 70 hung from a shaft 72 mounted in the block 66. A pinion 74 on the shaft 72 is engaged by a rack 76 connected by a link 78 to the outer end of an arm 80 on one end of a horizontal shaft 82 carried in bearings 84. An arm 86 on the other end of the shaft 82 carries a roller 88 riding on a cam 90 on a second horizontal shaft 92 located below and to the rear of the shaft 82. A spring 94 serves normally to rock the shaft 82 in a direction to close the door 70, the door being automatically opened by the cam at the proper time to dispense a core, as hereinafter described. The outlet passage in the block 66 is provided with a lining 71 and the door 70 with a gasket 73 to insure sealing of the device.

The dispensing mechanism is driven by a motor 96 through a speed reduction gearing 98, both mounted on the base 31 beneath the refrigerating chamber. The motor is adapted to run continuously and, through a belt 100 extending about a pulley 102 on a shaft 104, continuously rotates a clutch element 106 pinned to the shaft 104. The shaft 104 is in coaxial alignment with the shaft 92 and a cooperating clutch element 108 is pinned to the shaft 92 adjacent to the element 106, as shown in Figs. 9 and 10. Means, now to be described, is provided for engaging the clutch elements 106 and 108 to cause one rotation of the shaft 92 when any one of the controllers 58 is depressed, as by the attendant's foot.

The opposing faces of the clutch elements 106 and 108 are provided with cooperating clutch means including a member 110 slidably mounted in the element 108 and carrying a stud 111 to engage within holes 112 in a ring 114 fixed within the element 106, the element 108 preferably extending into the recess of the element 106 which carries the ring 114. A spring 116, backed by an annular plate 117 secured to the element 108, normally forces the member 110 toward the element 106. An annular recess 118 is provided around the element 108 and detent 120 pivoted at 122 has its free end beveled at 124 and this free end normally extends into the recess 118, as shown in Fig. 6. The member 110 is recessed at 126 and the wall of the recess cooperating with the beveled surface 124 is correspondingly beveled. The engagement of these surfaces is adapted to withdraw the stud 111 from engagement with the ring 114 and hold the same withdrawn, as hereinafter described.

An arm 128 on the detent 120 carries a downwardly-extending bar 130 at its free end, a spring 132 connecting the arm with a fixed plate 134 serving normally to hold the detent engaged against the bottom of the annular recess 118. An arm 136 pivoted at 138 has a yoke-like end pivotally carrying a pawl comprising an upwardly-extending arm 140 and two arms 142 and 144 extending outwardly in opposite directions. A spring 149 connected to the arm 144 normally holds the arm 140 against the bar 130, in which position the end of the arm cooperates with a shoulder 148 on the bar, a pin 150 being provided on the arm 136 for limiting movement of the bar away from the arm 140. Downward pivotal movement of the arm 136 is limited by a stop 152 and the arm is adapted to be lifted upwardly by a solenoid comprising an electro-magnet 154 acting on an armature 156 extending thereinto and connected to the arm 136 at 158. When the solenoid is energized, the arm 136 is raised (from its lowermost position, Fig. 6) and, by engagement of the arm 140 with the shoulder 148, the detent 120 is swung outwardly to release the member 110, which thereupon immediately snaps into engagement with the continuously rotating clutch element 106. Directly following this releasing position, the arm 142 engages a stop 160 depending from the plate 134 and swings the arm 140 free from the shoulder 148, thereby releasing the detent which thereupon again engages with the member 108 under the action of the spring 132. Withdrawing of the detent permits the stud 111 to clutch into the ring 114 and the subsequent releasing of the detent permits it to enter the recess 126 and withdraw the member 110 and its stud 111 at the end of one rotation of the shaft 92.

The solenoid 154 is controlled by the switches or controllers 58, the closing of a switch 58 causing the arm 136 to be raised. The first effect of such movement of the arm is to withdraw the detent 120 and cause the clutching of the member 108 to member 106. Continued movement of the armature 156 causes disengagement of the arm 140 from the shoulder 148 and the releasing of the bar 130 and its detent 120. The detent thereupon re-engages within the recess 118 and withdraws the member 110 at the end of one rotation of the shaft 92.

Splined to the shaft 92 is a sleeve 162 embodying a worm 164 at one end and a cam groove 166 within an enlarged portion of its other end. The worm is in mesh with a worm wheel 168 keyed to the sleeve 68. A bar 170, held in fixed position by screws 172, carries a roller 173 engaging within the cam groove 166. The shape of the cam groove is such that the sleeve is moved to the left (Fig. 4) during the first half rotation of the shaft 92 and is moved to the right during the second half rotation thereof, the parts being so designed that this movement gives to the worm wheel 168, during the first half rotation of the shaft 92, the entire rotation imparted to it from a full rotation of said shaft, the worm wheel remaining stationary during the latter half rotation of said shaft 92. The function of this movement is to give the cage 44 its core dispensing rotation during the first portion of each core dispensing cycle, thus leaving the latter portion of the cycle for the completing of the core dispensing operation.

Each dispensing cycle extends through one complete rotation of the shaft 92. During the first half of this cycle, the cage 44 is rotated sufficiently to drop a frozen core into the channel 62 and thereafter, during the latter half of the cycle, the cam 90 functions to rotate the shaft 82 in a manner opening the door 70 and permitting the core to pass outwardly through the spout 64 and onto the inclined runway 60. The core rolls down the runway until grasped by the attendant, one such runway serving several winding machines, as illustrated in Fig. 11.

It is obvious that two or more operators or attendants may be served from a single core freezing device by extending the runway 60 to a length greater than that shown in Fig. 11. The operators may also be served by providing independent runways, as shown in Fig. 12. In this case, two runways 174 diverge outwardly from the core dispensing exit 176, and a pivoted spout 178 is adapted to deliver the dispensed core to either runway merely by being pivoted into alignment with the runway selected. The spout may be pivoted by a rack bar 180 in mesh with a toothed segment 182 carried by the spout, the ends of the bar acting as armatures and extending into magnetic coils 184. Energizing of either coil will draw the bar thereinto and pivot the spout into alignment with the corresponding runway. The coils will preferably be connected to the controlling switches 58 corresponding to the respective runways, whereby the spout will be automatically moved to deliver the dispensed core into the runway corresponding to the switch operated.

It is desirable that unfrozen cores be fed to the top end of the path 38 as frozen cores are removed from the bottom end thereof thereby providing for the continuous operation of the device. These unfrozen cores may be supplied from a hopper 123 mounted on the cover 18. A tubular member 125 extending downwardly through the cover provides a core passage or channel from the bottom of the hopper to the top end of the path 38. The upper end of this tube extends through a hole in the bottom wall of the hopper and the lower end thereof cooperates with a hole through the top plate 127 of the member 50. Resting on the bottom wall of the hopper is a disk 129 having a series of holes 131 therein each adapted to receive a core, the holes being so located that upon rotation of the disk they come into alignment with the channel 125. The holes are open to the hopper except at the location above the channel and at this location a shield member 133 so covers the disk as to prevent at all times a direct open passage into the channel, transfer of heat from the atmosphere to the refrigerating chamber being thereby substantially eliminated. The hopper may have a removable cover 135 and a window 137 is provided for observing the quantity of cores remaining in the hopper.

Mechanism heretofore described provides for a core dispensing rotation of the cage the distance between two adjacent cores at each dispensing cycle, and cooperating connections which will now be described provide for a like and simultaneous rotation of the disk 129 automatically to feed an unfrozen core from the hopper into the top end of the path 38 whenever a frozen core is discharged from the bottom end thereof. The top cage disk 46 has projecting upwardly therefrom and through the plate 127 a stud 139 and a shaft 141 secured to the disk 129 extends downwardly through the cover 18 and has a key and slot engagement 143 with this stud. It will, therefore, be seen that rotation of the cage is thus imparted to the disk 129 and that a core is automatically dropped through the channel 125 at each dispensing operation, it being understood that the holes 131 are in alignment with the vertical rows of cores in the cage. The key and slot engagement 143 permits the cover 18 to be opened for refilling the chamber with ice or for other reasons.

From the foregoing description it will be apparent that we have provided a device having capacity for maintaining a large supply of the articles to be frozen in a refrigerated zone, with the result that each article is subjected to freezing temperature for a relatively long interval. When first filling the device with cores or like articles to be frozen, it is desirable that the cage 44 shall be constantly rotated, without necessitating the use of the controllers 58, until the spiral path 38 is completely filled with the cores. Means, including a handle 186 pivoted at 122, is provided for this purpose. The portion 188 of the handle extending beyond the pivot 122 engages beneath a pin 190 on the arm 128 in such manner that when the outer portion of the handle is held depressed the detent 120 is held out (Fig. 7) against the action of the spring 132. In such position of the detent, the member 110—111 connects the clutch elements 106 and 108 to rotate continuously the shaft 92. In the normal operation of the machine the handle is held in the inoperative position, shown in Fig. 6, by a latch hook 192.

It is believed that the construction, operation and advantages of our invention will now be fully apparent. Assuming that the device is filled with dry ice and cores 32 as shown in Fig. 1, that the cores in the spiral path 38 are in frozen condition and ready for winding, and that the motor 96 is running, the operation of the machine is substantially as follows. The attendant, desiring a core, depresses the most convenient switch 58, whereupon the solenoid 154 raises the arm 136 which, through the contact 140—148, withdraws the detent 120 from the position of Fig. 6 to the position of Fig. 7. The member 110—111 thereupon immediately snaps into clutching engagement with the clutch element 106 to rotate the shaft 92. In the continued upward movement of the arm 136, the arm 142 engages the stop 160 and withdraws the arm 140 from the shoulder 148, the detent 120 thereupon snapping back into engagement with the recessed portion 118 and in the path of movement of the recess 126. In such position the beveled portion 124 of the detent withdraws the member 110 and thereby disengages the clutch elements 106 and 108 at the end of one rotation of the shaft 92. It will be noted that the stop 160 eliminates any possibility of continuously holding the detent 120 out by means of a switch 58.

The construction and operation of the sleeve 162, as heretofore described, is such that the worm gear 168 and the cage 44 are rotated only during the first half rotation of the shaft 92, this rotation of the cage depositing a frozen core into the channel 62 and simultaneously depositing an unfrozen core from the hopper 123 into the top end of the spiral path 38. During the second half rotation of the shaft 92, the core passes down the channel 62 and is dispensed onto the runway 60 through the opening of the door 70 by means of the cam 90. The core rolls down the runway and is conveniently grasped by the attendant. The runway 60 may be extended to serve more than one attendant or independent runways may be used in any convenient manner such, for example, as suggested in Fig. 12. It will be apparent that the device automatically provides a continuous supply of cores, frozen without distortion, and delivers the frozen cores to the attendants as needed in a most efficient and rapid manner.

Having thus described our invention, what we claim as new and desire to secure by Letters Patent is:

1. A device for freezing flexible balls and dispensing the frozen product, comprising a refrigerated chamber having a passage for maintaining a series of balls in a freezing zone, means including a controller at a station remote from the device for causing the balls to be dispensed from the device, and means for receiving the dispensed balls and transporting them to said station.

2. A device for freezing flexible balls and dispensing the frozen product, comprising a refrigerated chamber having a passage for maintaining a series of balls in a freezing zone, means for dispensing the balls individually from the device, a controller at a station remote from the device for controlling the operation of the dispensing means, and means including an inclined runway for receiving the dispensed balls and transporting them to said station.

3. A device for freezing flexible balls and dispensing the frozen product, comprising a refrigerated chamber having a passage for maintaining a series of balls in a freezing zone, means including a controller at a station remote from the device for causing the balls to be dispensed individually from the device, means for receiving the dispensed balls and transporting them to said station, and means for preventing the dispensing of more than one ball at each operation of the controller.

4. A device for freezing flexible balls and dispensing the frozen product, comprising a refrigerated chamber having a passage for maintaining a series of balls in a freezing zone, means including a controller at a station remote from the device for causing the balls to be dispensed individually from the device, means for receiving the dispensed balls and transporting them to said station, and means for preventing the dispensing of more than one ball at each operation of the controller and for preventing the setting of the controlling means to dispense a succeeding ball until the completion of each dispensing cycle.

5. A device for freezing flexible balls and dispensing the frozen product, comprising a refrigerated chamber having a passage for maintaining a series of balls in a freezing zone, means including a plurality of independent manually operated controllers at stations remote from the device for causing the balls to be dispensed from the device, and means for receiving the dispensed balls and transporting them to said stations.

6. A device for freezing flexible balls and dispensing the frozen product, comprising a refrigerated chamber having a passage for maintaining a series of balls in a freezing zone, means including a plurality of manually operated controllers at stations remote from the device for causing the balls to be dispensed from the device, independent means for transporting the dispensed balls to the respective stations, and means under the control of said controllers for causing the dispensed balls to be deposited respectively in the transporting means of that controller which is operated.

7. A device for freezing flexible balls and dispensing the frozen product, comprising a refrigerated chamber having a passage for mantaining a series of balls in a freezing zone, a pivotally mounted member for receiving balls dispensed from the device means including a plurality of controllers at stations remote from the device for causing the balls to be dispensed from the device to the member, independent inclined runways for transporting the dispensed balls to the respective stations, and means under the control of said controllers for causing pivotal movement of the member into operative alignment with the runway of the controller operated.

8. A device for freezing flexible balls and dispensing the frozen product, comprising a refrigerated chamber having an inclined circuitous passage for maintaining a series of balls in a freezing zone, a rotary holder in the chamber holding certain of the balls in spaced relation, a motor, means driven from the motor for causing rotation of the rotary holder, a controller at a station remote from the device for causing operation of the motor-driven means to dispense one ball each time the controller is operated, and means for receiving the dispensed balls and transporting them to said station.

9. A device for freezing flexible balls and dispensing the frozen product, comprising a refrigerated chamber having a passage for maintaining a series of balls in a freezing zone, a continuously operating motor, means driven from the motor for causing the dispensing of the balls from the device, a clutch between the motor and said motor-driven means, a controller at a station remote from the device for causing engagement of the clutch and operation of said means to dispense one ball each time the controller is operated, and means for receiving the dispensed balls and transporting them to said station.

10. A device for freezing flexible balls and dispensing the frozen product, comprising a refrigerated chamber having a passage for maintaining a series of balls in a freezing zone, a motor, mechanism driven from the motor for causing the dispensing of the balls from the device, a solenoid for initiating operation of said mechanism to dispense a ball from the device when the solenoid is energized, a switch at a station remote from the device for controlling the solenoid, and means for receiving the dispensed balls and transporting them to said station.

11. A device for freezing flexible balls and dispensing the frozen product, comprising a refrigerated chamber having a passage for maintaining a series of balls in a freezing zone, a motor, means driven from the motor for causing the dispensing of the balls from the device, a solenoid, means for causing operation of the first-named means by the motor to dispense a ball from the device when the solenoid is energized, two switches respectively at two stations remote from the device for controlling the solenoid, independent means for transporting the dispensed balls to the stations respectively, and means including other solenoids under the control of said switches for causing the dispensed balls to be deposited respectively in the transporting means of the switch operated.

12. A device for freezing flexible balls and dispensing the frozen product, comprising a refrigerated chamber having a pasasge for maintaining a series of balls in a freezing zone, means providing a ball exit channel therefrom, a rotary member for dispensing balls from the chamber into the channel, a motor, mechanism driven from the motor through a ball dispensing cycle for rotating the member and causing the dispensing of a ball into the channel, manually-controlled means for starting the mechanism to carry out the cycle, and means acting automatically to stop said mechanism at the end of the cycle.

13. A device for freezing flexible balls and dispensing the frozen product, comprising a refrigerated chamber having a passage for maintaining a series of balls in a freezing zone, means providing a ball exit channel therefrom, a closure for the channel, a member for discharging balls from the chamber into the channel, a motor, mechanism driven from the motor through a ball dispensing cycle, first to discharge a ball into the channel and thereafter open the closure to permit the exit of a ball, and means whereby the motor-driven mechanism may be started and stopped for carrying out said cycles intermittently.

14. A device for freezing flexible balls and dispensing the frozen product, comprising a refrigerated chamber having a passage for maintaining a series of balls in a freezing zone, motor driven mechanism for causing frozen balls to be dispensed individually from the device, and a controller located at a distance from said device for throwing said mechanism into operation.

15. A device for freezing flexible balls and dispensing the frozen product, comprising a refrigerated chamber having a circuitous passage for maintaining a series of balls in a freezing zone, rotary dispensing means in the chamber, motor driven mechanism for rotating said dispensing means, means for stopping the rotation thereof after one ball has been dispensed, and means for delivering the dispensed balls to a predetermined location.

16. A device for freezing flexible balls and dispensing the frozen product, comprising a refrigerated chamber having a passage for maintaining a series of balls in a freezing zone, motor driven mechanism for causing frozen balls to be dispensed individually from one end of the passage, a remote control switch for said mechanism, and means including a hopper for supplying unfrozen balls to the other end of the passage as the frozen balls are dispensed, said dispensing means being operated in such a manner as to convey balls from the hopper into said passage.

17. A device for freezing and dispensing golf ball cores, comprising a cylindrical member having a spiral groove therein forming a continuous path, means surrounding and cooperating with the member for maintaining a plurality of cores in said path, means providing a refrigerated zone adjacent to the path both inside and outside of said member, and cooperating means for governing the movement of the cores along the path and the discharge of one frozen core after another from said refrigerated zone.

18. A device for freezing flexible balls and dispensing the frozen product, comprising a refrigerated chamber having a passage for maintaining a series of balls in a freezing zone, power driven mechanism for ejecting from the device one frozen ball at a time, and means for controlling the action of said mechanism from a distance.

19. A device for freezing and dispensing rubber cores for golf balls, comprising a refrigerating chamber having a vertically-disposed cylindrical member therein with a core-retaining path in its outer surface and an internal chamber having an inlet and being adapted to receive a refrigerating medium, and means for maintaining a refrigerating medium also adjacent to the exterior surface of said member.

20. A device for freezing and dispensing rubber cores for golf balls, comprising a refrigerating chamber having means for maintaining refrigerating medium in two vertically-disposed concentric bodies with an annular space between, means for guiding a series of cores in a spiral path through said annular space, and power-operated mechanism for governing the rate of movement of the cores along said path.

CHARLES R. SIBLEY.
ARTHUR F. PYM.